US008812628B2

(12) United States Patent
Vermoesen

(10) Patent No.: US 8,812,628 B2
(45) Date of Patent: Aug. 19, 2014

(54) METHOD AND SYSTEM FOR REMOTE CONFIGURATION OF A DEVICE

(75) Inventor: Luc Vermoesen, Bornem (BE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/146,561

(22) PCT Filed: Feb. 24, 2010

(86) PCT No.: PCT/EP2010/052328
§ 371 (c)(1),
(2), (4) Date: Aug. 31, 2011

(87) PCT Pub. No.: WO2010/102902
PCT Pub. Date: Sep. 16, 2010

(65) Prior Publication Data
US 2011/0314137 A1    Dec. 22, 2011

(30) Foreign Application Priority Data

Mar. 9, 2009  (EP) .................................. 09305213

(51) Int. Cl.
*G06F 15/177*  (2006.01)
*G06F 15/16*   (2006.01)

(52) U.S. Cl.
USPC .......................................... 709/220; 709/229

(58) Field of Classification Search
USPC .................. 709/220–223, 226, 229
See application file for complete search history.

(56) References Cited

U.S. PATENT DOCUMENTS

| | | | | |
|---|---|---|---|---|
| 4,787,033 A * | 11/1988 | Bomba et al. | .................. | 710/116 |
| 6,263,360 B1 * | 7/2001 | Arnold et al. | .................. | 709/203 |
| 6,286,038 B1 * | 9/2001 | Reichmeyer et al. | ......... | 709/220 |
| 6,304,873 B1 * | 10/2001 | Klein et al. | ........................... | 1/1 |
| 6,538,668 B1 * | 3/2003 | Ruberg et al. | .................. | 715/747 |
| 7,233,975 B1 * | 6/2007 | Gerraty et al. | ................. | 709/213 |
| 7,421,430 B2 * | 9/2008 | Meng | ..................................... | 1/1 |
| 7,539,481 B2 * | 5/2009 | Abhishek et al. | ............. | 455/410 |
| 7,606,888 B2 * | 10/2009 | Tanner et al. | .................. | 709/223 |
| 8,090,806 B1 * | 1/2012 | Freskos et al. | ................. | 709/221 |
| 8,125,894 B2 * | 2/2012 | Van Den Bosch et al. | ... | 370/219 |
| 8,370,463 B2 * | 2/2013 | Squire et al. | .................... | 709/220 |
| 2003/0200212 A1 * | 10/2003 | Benson et al. | ..................... | 707/7 |
| 2003/0204534 A1 * | 10/2003 | Hopeman et al. | ............. | 707/200 |
| 2008/0133718 A1 | 6/2008 | Bouchat et al. | | |
| 2009/0276431 A1 * | 11/2009 | Lind et al. | .......................... | 707/8 |

FOREIGN PATENT DOCUMENTS

CN        101217441 A    7/2008
EP        1927919 A1     6/2008

OTHER PUBLICATIONS

Enns R et al: "NETCONF Configuration Protocol; rfc4741.txt" IETF Standard, Internet Engineering Task Force, IETF, CH, Dec. 1, 2006, XP015048710, ISSN: 0000-0003.
Herlihy M., "Wait-Free Synchronization" ACM Transactions on Programming Languages and Systems, vol. 11, Jan. 1, 1991, pp. 1-26, XP040028632 ACM, 2 Penn Plaza, Suite 701—New York USA.
Broadband Forum Technical Report, TR-069 CPE WAN Management Protocol v1.1, The Broadband Forum, pp. 1-138, Dec. 31, 2007.
Office Action for corresponding Korean Application No. 10-2011-7023584 dated Oct. 23, 2013 and English translation thereof.
Office Action for corresponding Chinese Application No. 201080011671.8 dated May 19, 2014 and English translation thereof.

* cited by examiner

*Primary Examiner* — Lance L Barry
(74) *Attorney, Agent, or Firm* — Harness, Dickey & Pierce

(57) ABSTRACT

Method for remote configuration of a device via a network by means of a remote autoconfiguration server (ACS), wherein the configuration includes creating new data, or modifying or deleting writeable data of the device. The TR-069 CPE WAN management protocol may be used for communicating between the ACS and the device. The remote management protocol uses sessions consisting of transactions, where a transaction is a single request followed by a single response. Within a session, when writeable data has to be created, modified or deleted by the ACS, at least the writeable data to be created, deleted or modified are write-locked for other management agents at the transaction level. The write-lock is released within the session, after a successful configuration and/or after a failure.

13 Claims, 5 Drawing Sheets

METHOD AND SYSTEM FOR REMOTE CONFIGURATION OF A DEVICE

The present invention relates to a method and system for a remote configuration of a device using a remote autoconfiguration server (ACS) to configure the device.

BACKGROUND

Lately, it has become common to allow devices, like CPE's such as set-up boxes, voice-over IP devices, laptops, modems, routers, gateways and the like, to be configured via a network by means of an autoconfiguration server. There exist several protocols to do remote management, such as for instance TR-069 or SNMP (Simple Network Management Protocol).

TR-069 is an abbreviation for Technical Report 069, and is a DSL Forum technical specification entitled CPE WAN Management Protocol (CWMP). This protocol is intended for the communication between a CPE and an Autoconfiguration Server (ACS), and defines an application layer protocol for remote management of end user devices. CWMP includes both a safe autoconfiguration and the control of other CPE management functions within an integrated framework. The TR-069 remote management protocol consists of an object model in which remote procedure calls (RPC's) are invoked for bidirectional communication between a CPE device and an ACS.

In the TR-069 CPE WAN management protocol, a session or transaction session is defined as a contiguous sequence of CWMP transactions between a CPE and an ACS, wherein a session may span multiple TCP connections. A transaction is defined as a message exchange between a CPE and ACS consisting of a single request followed by a single response, initiated either by the CPE or by the ACS.

From the time a session is initiated until the session is terminated, the CPE must ensure the transactional integrity of all parameters accessible via the CWMP. During the course of a session, all configurable parameters of the CPE must appear to the ACS as a consistent set modified only by the ACS. In other words, throughout the session the CPE must shield the ACS from seeing any updates to the parameters performed by other entities. This includes both the values of configurable parameters as well as the presence or absence of configurable parameters and objects. In order to ensure the transactional integrity of the session, it may e.g. be necessary, for the CPE, in exceptional cases, to terminate a LAN-side management session, such as a SNMP session or an CLI session, in order to meet CWMP session establishment requirements.

For example in the case of home network management, multiple management actors/agents will manage the different devices in the home network. Due to the TR-069 protocol constraints stated above, near-real-time management using the TR-069 protocol becomes problematic since the TR-069 management agent requires this transaction integrity at session level. This will either exclude other management agents from managing the device since they could alter the state of the device during a TR-069 session, or the TR-069 management agent is presented with a view on the device state that does not correspond to the actual device state since other management interfaces are configuring the device during a session.

In order to allow simultaneous management of different management agents in a device by multiple management actors, a solution proposed in the prior art is to have a one-to-one correspondence between a TR-069 session and a TR-069 transaction. However, this solution has the significant overhead of establishing a session, executing a transaction and clearing the session, and this for all transactions that need to be performed. Additionally, during a session, the current view on the data to be managed must be retrieved by the ACS in order to correctly execute the transaction. This solution causes significant processing overhead both at the CPE and the ACS.

In the present application, by way of a non-limiting example, reference is made to the TR-069 protocol, however without excluding any equivalent protocols, either already existing or to be developed in the future, on which the present invention can be applied.

SUMMARY

The object of the present invention is to provide a method and system as described in the preamble, which allows for different management agents to configure a device simultaneously, and this in an improved way when compared to the solutions provided by the prior art.

According to an embodiment of the invention the method for remote configuration of a device via a network by means of a remote auto-configuration server (ACS), comprises configuring a device such as creating new data (e.g. creating a new object), or modifying or deleting writeable data (e.g. deleting an object or modifying certain parameters) of the device, wherein an application layer remote management protocol is used for communicating between the ACS and the device, said remote management protocol using sessions consisting of transactions, a transaction being a single request followed by a single response, wherein within a session, when writeable data has to be created, modified or deleted by the ACS, at least the writeable data to be created, deleted or modified are write-locked for other management agents at the transaction level, and wherein the write-lock is released within said session, after a successful configuration and/or after a failure. By using the method of the invention transactional integrity is not at the session level but at the transaction level.

Preferably the TR-069 CPE WAN management protocol is used for communicating between the ACS and the device, said remote management protocol using sessions consisting of transactions, a transaction being a single request followed by a single response.

The writeable data can be any form of data which can be modified, created or deleted using the application layer remote management protocol, such as parameters and objects. The skilled person will understand that any other types of writeable data which may in the future be added to the TR-069 protocol, also fall within the scope of protection as determined by the claims.

According to a possible embodiment of the method of the invention, a begin transaction call is sent by the ACS to the device within a session, causing the device to write-lock the writeable data for other management agents, whereupon a call for creating new data, or for deleting or modifying writeable data is performed. When data has to be modified it may be preferred that after the write-locking of the device, first current values of a set of data are obtained by the ACS, and next a call for setting this set of data is sent by the ACS to the device. Preferably releasing the write lock is coupled with the sending of a call from the device to the ACS to indicate the end of a transaction.

According to another possible embodiment, within a session, a call for creating new data, or for deleting or modifying writeable data is sent from the ACS to the device, causing the device to write-lock the writeable data for other management agents, whereupon the new data is created or the writeable data is deleted or modified.

According to yet another possible embodiment, the ACS sends a set of current values of writeable data as well as a set of new values to be set to the device, whereupon the device performs the write-locking and proceeds with the setting if the device allows the setting. Preferably the device performs the write-locking and proceeds with the setting if the sent set of current values corresponds with the actual values of the writeable data. If the device proceeds with the setting, and if the setting is successful, the ACS is preferably informed of a successful setting whereupon the device immediately releases the write-lock. If the device does not proceed with the setting, the ACS is informed accordingly, a rollback is performed, and the device releases the write-lock.

The invention also relates to an auto-configuration server for remote configuration of a device. According to an embodiment of the invention the ACS is adapted to instruct the device within a session, when new data has to be created in the device, or when writeable data of the device has to be modified or deleted by the ACS, to write-lock at least the writeable data to be created, modified or deleted for other management agents, at the transaction level. Preferably the ACS is adapted to use the TR-069 CPE WAN management protocol for communicating between the ACS and the device.

According to a possible embodiment the ACS is adapted to send a call to the device to indicate the begin of a transaction causing the write locking of writeable data for other agents. Further the ACS is preferably adapted to send a call to the device with a set of current values of writeable data as well as a set of new values to be set.

Finally the invention relates to a device having writeable data. According to an embodiment the device is adapted for being remotely configured via a network by means of an ACS, said device being further adapted to write lock writeable data within a session with the ACS, when writeable data has to be created, modified or deleted;

to release a write-lock within a session, at the transaction level, after a successful configuration of writeable data or after a failure. Preferably, the device is adapted to use the TR-069 CPE WAN management protocol for communicating between with the ACS.

BRIEF DESCRIPTION OF THE FIGURES

The accompanying drawings are used to illustrate presently preferred non-limiting exemplary embodiments of the present invention. The above and other advantages, features and objects of the invention will become more apparent, and the invention will be better understood from the following detailed description when read in conjunction with the accompanying drawings in which.

DESCRIPTION OF THE EMBODIMENTS

Figure 1:
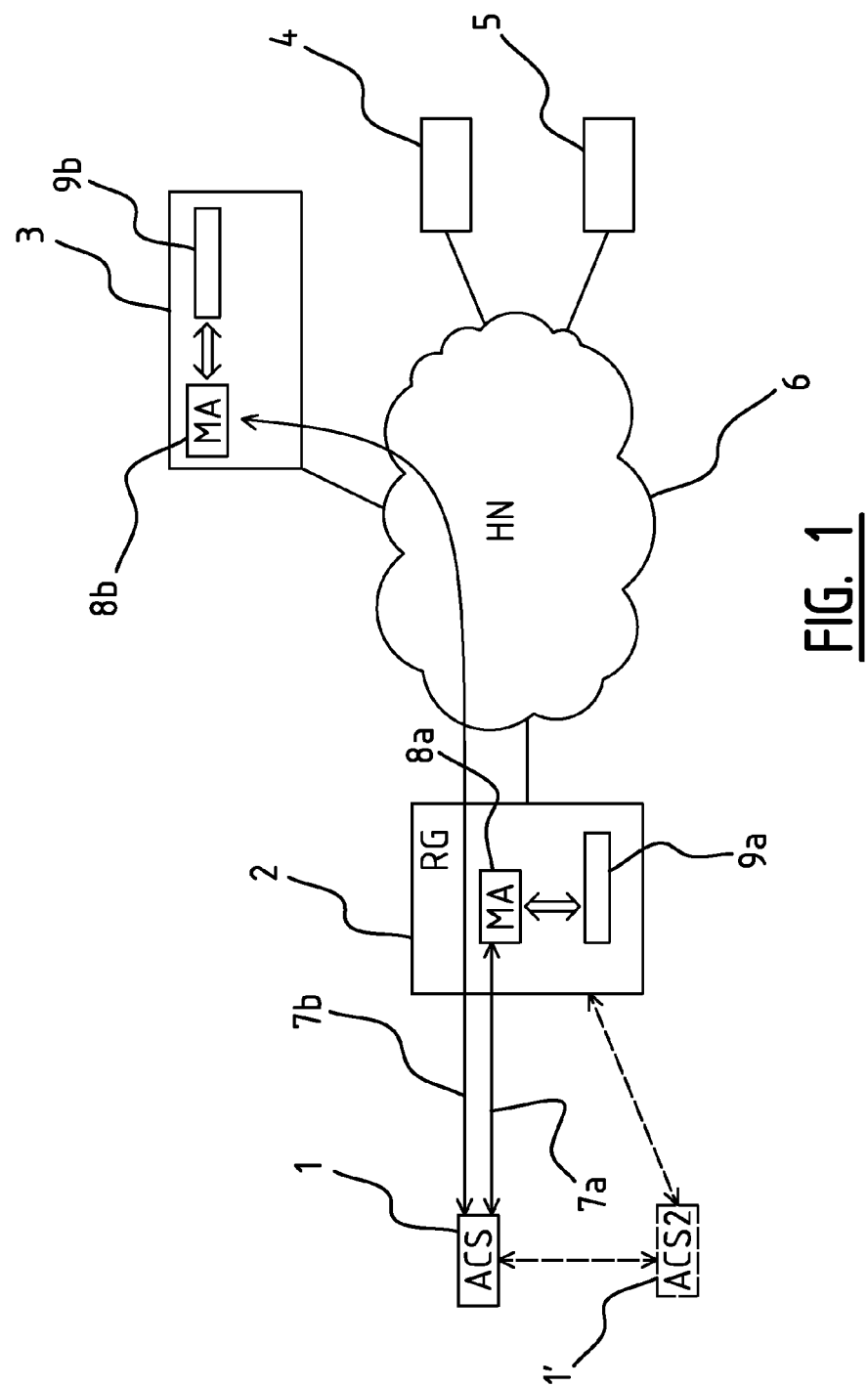
FIG. 1 is a schematic view of an architecture with a home network with a number of CPE's which can be remotely managed by an ACS.

FIG. 1 illustrates a communication system with one or more auto-configuration servers 1, 1' which reside in the network and which are adapted to manage devices at the subscriber premises. Here the devices consist of routing gateway (RG) 2, and three other devices 3, 4, 5. The devices 3, 4, 5 are coupled to the routing gateway 2 over the home network 6 that may for instance be a wireless network. When a device wants to communicate with an ACS or vice versa, the TR-069 session 7a, 7b is started. A management agent or management client 8a, 8b serves as an interface between a bundle or a software application and the ACS 1, and enables the management platform in the device to expose manageable parameters to the ACS. In the example of FIG. 1 a first session 7a is illustrated between the ACS 1 and the RG 2, wherein the managing of the manageable part 9a of the RG 2 is done via a management agent 8a. Also a second session 7b is illustrated between the ACS 1 and the device 3, wherein the managing of the manageable part 9b of the device 3 is done via a management agent 8b.

Figure 2:
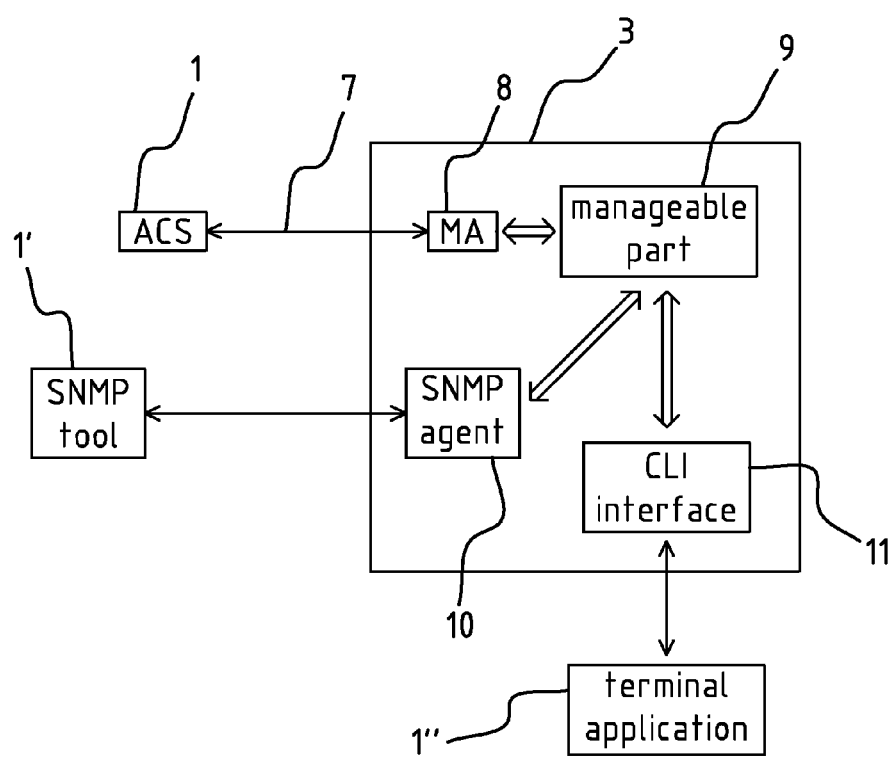
FIG. 2 illustrates schematically the situation wherein a CPE is configured by a number of different management agents simultaneously.

FIG. 2 illustrates the situation where different management actors 1, 1', 1" manage different management agents, here a TR-069 agent 8, a SNMP agent 10, and a CLI agent 11, respectively, which agents are in the process of configuring the device 3 simultaneously. In order to make such a simultaneous communication possible, whilst ensuring transactional integrity of the session 7 between the ACS 1 and the device 3, the method of the invention can be used.

Now two embodiments of the method of the invention will be illustrated with reference to FIGS. 3 and 4.

Figure 3:
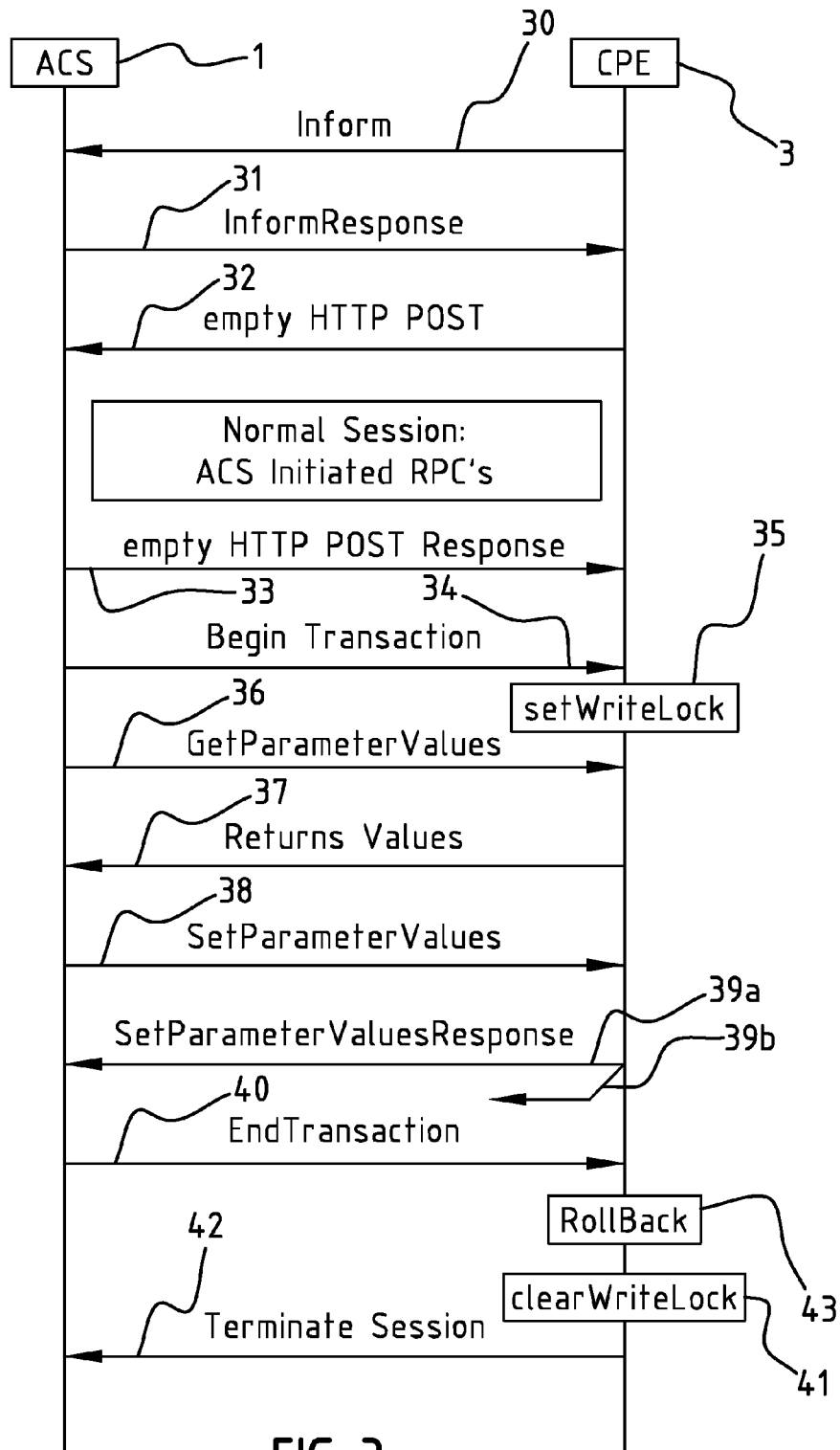
FIG. 3 illustrates a message exchange according to a first embodiment of the method of the present invention.

According to the first embodiment illustrated in FIG. 3, a write lock of the device (CPE) is introduced, during which lock the setting of the values is performed and the transaction is ended, whereupon the CPE write lock is released.

The TR-069 protocol already provides the necessary protocol definitions to support, commit and rollback at the level of a TR-069 transaction.

However, an extension is necessary so that the CPE should be made aware that it needs to perform a transactional integrity at the level of a TR-069 transaction, instead of at the TR-069 session level as in the prior art.

According to the embodiment illustrated in FIG. 3 this extension is realised by providing an additional set of remote procedure calls (RPC's) denoting the begin and optional end of a transaction, see the RPC 34 "BeginTransaction", and the RPC 40 "EndTransaction" in FIG. 3. The RPC 34 "BeginTransaction" will initiate the setWriteLock 35 to write lock all or a part of the writeable data of the device, and the RPC 40 "EndTransaction" will clear the write lock ("clearWriteLock" 41).

Note that "EndTransaction" 40 could be optional given that the device could also adapted to automatically clear the write lock upon the creation, modification or deletion of writeable data (parameter, object, etc) of the device. Where the RPC is e.g. "SetParameterValues" or "CreateObject", etc, the write lock could be automatically ended after the parameters values are set, or after the object is created, respectively.

In the embodiment of FIG. 3, after exchanging a number of regular RPC's 30, 31, 32, 33, an embodiment of the method of the invention is performed, wherein the following messages are exchanged:

BeginTransaction 34 (write locks the CPE, see block 35);
GetParameterValues 36;
Return Values 37;
SetParameterValues 38; note that this could also be a different RPC such as "CreateObject", "DeleteObject", etc.;
receive either a SetParameterValuesResponse 39*a*, indicating success, or a SOAP FaultCode 39*b*, indicating failure; note that similar responses will be send after a "CreateObject", "DeleteObject" RPC;
EndTransaction 40 (which releases the write lock 41 on the CPE).

Note that the exchanged calls 36 en 37 will not always be needed. Sometimes it will not be necessary to know the current parameter values. For certain RPCs such as calls for creating a new object it will not be necessary to first ask for the current values of the parameters.

In the case RPC 38 has not been performed correctly, where for example only part of the parameters could be set correctly, the parameters will have to be reset to their old values (rollback). A first way to do this is to always store a copy of the old values in the device 3, so that the parameters can be restored to their old values. Another possibility is to store the old values in the ACS and to exchange messages with the ACS in other to get copies of the old values whereupon the restoration can be performed.

According to a further aspect of the invention, it is possible to provide some kind of protection against indefinitely locking by the ACS, leaving the CPE in a locked state. According to a possible embodiment the locking could e.g. be supervised by a timer.

Figure 4:
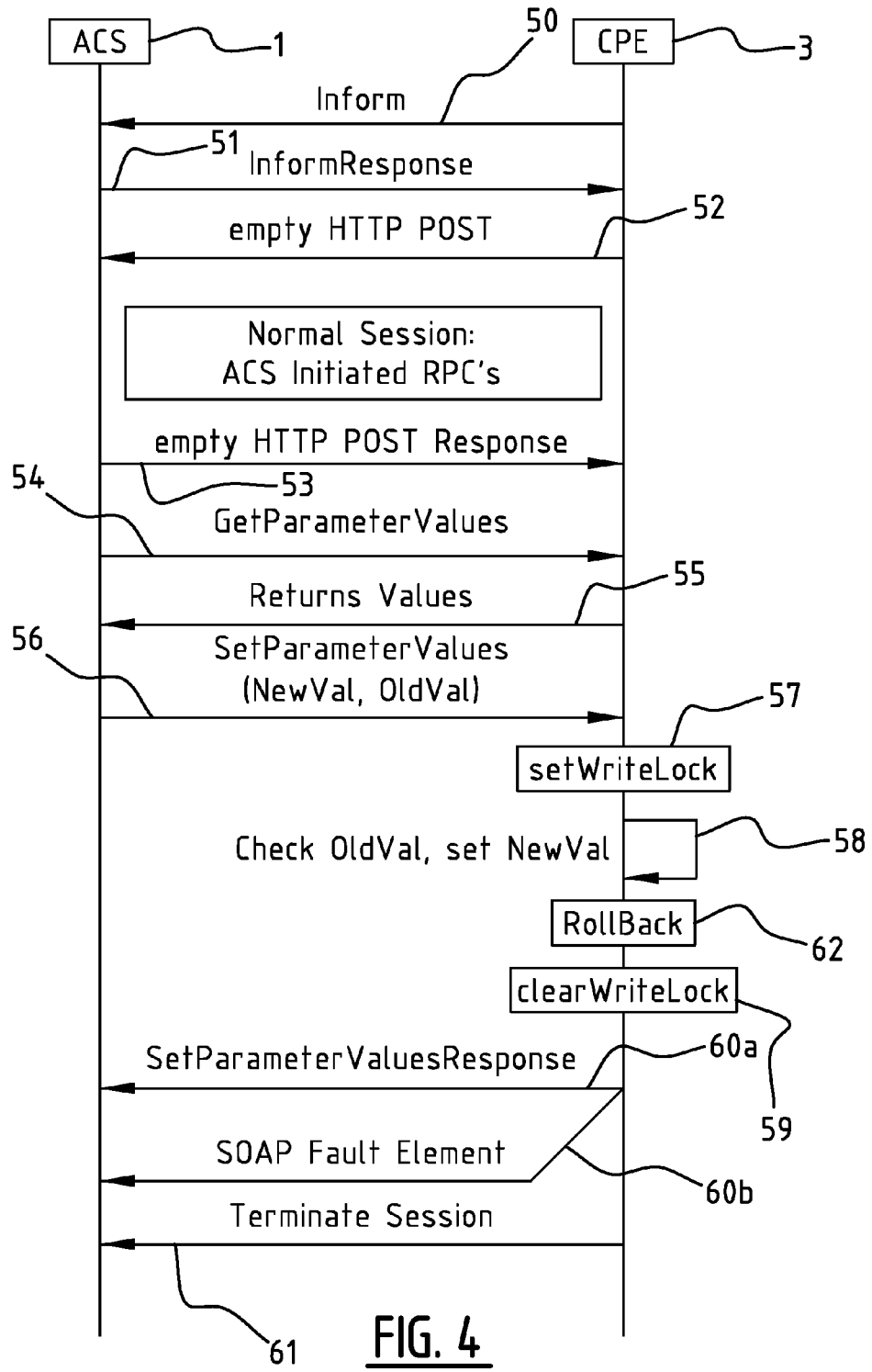
FIG. 4 illustrates a message exchange between an ACS and a CPE according to a second embodiment of the present invention.

According to a second embodiment of the invention of which an example is illustrated in FIG. 4, the management agents provide the current values as well as the new values that need to be set, allowing the CPE to first check for changed values and proceed with its setting of the new values only in case
the current values as delivered by the management agent correspond to the actual values, or
the CPE allows the new settings since they do not compromise its internal state.

In case the CPE accepts the setting of new values, the management agent needs to be informed, which could e.g. be done as shown in FIG. 4, using a SetParametersValueResponse 60*a*. In case of rejection the management agent could e.g. be informed by a SOAP Fault Element message 60*b*.

In order to perform the method according to the second embodiment, all RPC's related to object creation/deletion/modification as well as parameter modification could be extended so that the old values are passed in as an argument as well as the new values. In that way, upon the receipt in the CPE, the CPE is able to check whether the old values are still valid (i.e. whether the ACS view on the data is still correct for the parameters passed in the old values list) and can then proceed to process the setting of the new values. By having this extension, the CPE is made aware that it needs to perform a transactional integrity at the level of a TR-069 transaction instead of at the TR-069 session level, allowing the CPE to preserve transactional integrity for the duration of a transaction instead of a session.

According to the embodiment illustrated in FIG. 4, first a number of regular RCP messages 50, 51, 52, 53 are exchanged between the ACS 1 and the CPE 3. In order to perform a SetParameterValues, optionally, first a GetParameterValues message 54 and a ReturnValues message 55 are exchanged between the ACS 1 and the CPE 3. Next, the following message exchange takes place:

SetParameterValues 56; the argument list according to the prior art has a ParameterList of the type ParameterValueStruct array and a ParameterKey argument of String 32. The argument list could e.g. be extended with an OldParameterList of type ParameterValueStruct array. All of the parameters available in the ParameterList should then be present in the OldParameterList.

Upon receipt in the CPE 3, the CPE 3 checks whether the OldParameterValues given by the RPC are the same as the values present in its current state. In case the CPE decides that the ACS delivered values correspond to its actual state, the SetParameterValues RPC for the new values is performed;
in case of success, the SetParameterValues response 60*a* is used;
in case of failure, a SOAP Fault element 60*b* is used containing Fault Code, Fault String and SetParameterValues-Fault elements. One could define for instance "FaultCode 9020: Modified OldParameter". This would then indicate to the ACS that the parameter that one tries to configure/set has been modified in the mean time by an external management agent/actor, etc.

In case of an unsuccessful setting of a number of parameters or an unsuccessful object creation, a rollback procedure indicated with block 62 has to be performed to restore the old state. This could be done in the same way as explained for FIG. 3.

Figure 5:
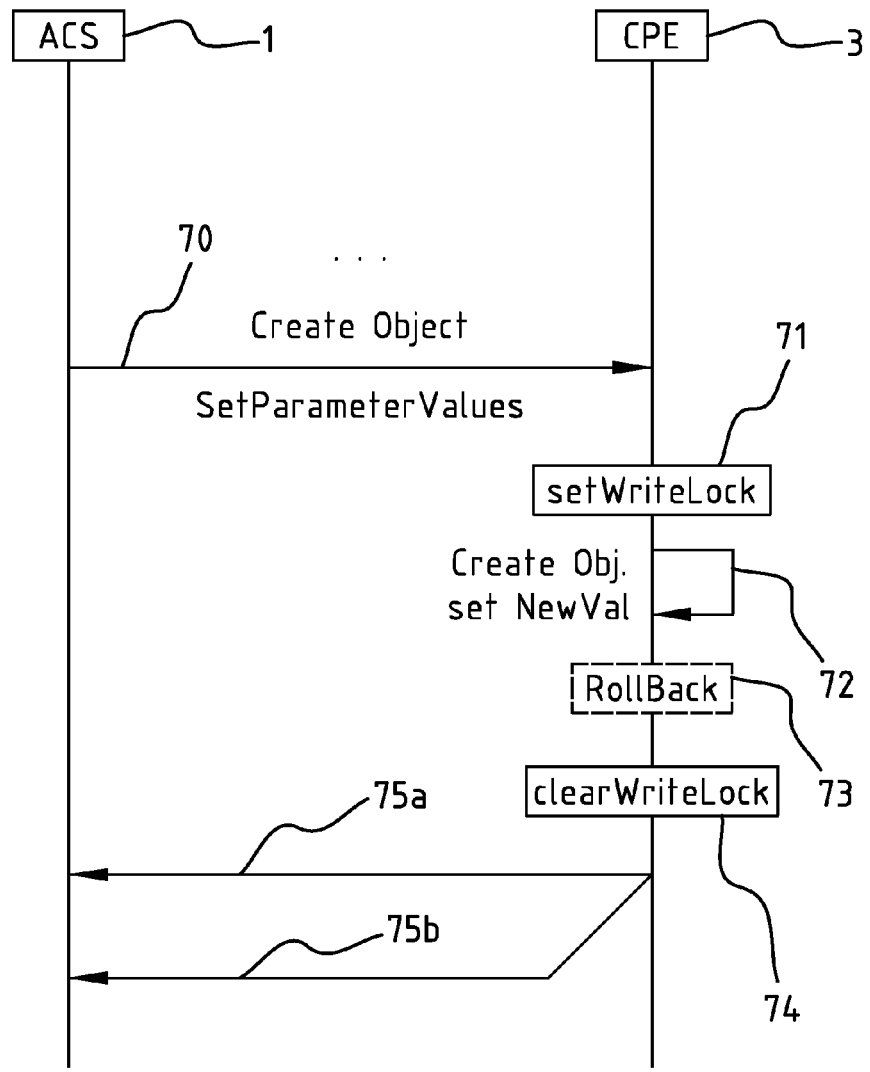
FIG. 5 illustrates a message exchange between an ACS and a CPE, according to yet another example embodiment.

Finally FIG. 5 illustrates a more basic embodiment of the invention where it is assumed that the creation, deletion or modification of writeable data (parameters, objects, etc) has to be performed regardless of the current values of the writeable data.

According to the embodiment illustrated in FIG. 5, first a number of regular RCP messages (not shown) are exchanged between the ACS 1 and the CPE 3. Next, the following message exchange takes place:
a call to modify/create/delete writeable data 70; e.g. SetParameterValues or CreateObject; this call will initiate at least the write locking 71 of the writeable data at issue, whereupon writeable data is modified/created/deleted, see step 72; in case of failure this will be followed by a rollback procedure 73; in case of success the write lock is immediately cleared, see step 74;
in case of success, an associated response 75*a* is sent to the ACS 1;
in case of failure, a fault response 75*b* is used.

While the principles of the invention have been set out above in connection with specific embodiments, it is to be clearly understood that this description is merely made by way of example and not as a limitation of the scope of protection which is determined by the appended claims.

The invention claimed is:
1. A method for a remote configuration of a device via a network by means of a remote auto configuration server (ACS), comprising:
at least one of creating new data, modifying writeable data and deleting writeable data of the device, by the ACS, via a TR-069 CPE WAN management protocol using a plurality of sessions, each of the plurality of sessions consisting of a plurality of transactions, each of the plurality of transactions being a single request followed by a single response;
at a level of the plurality of transactions, write-locking, by the ACS, at least the writeable data to be created, deleted or modified within each of the plurality of sessions, when writeable data has to be created, modified or deleted by the ACS, the write-locking preventing creation, deletion or modification of the writeable data by at least one other ACS;

sending a call, by the ACS to the device, for setting current values of the writeable data upon the ACS obtaining the current values of the writeable data; and releasing the write-locked data, at the level of the plurality of transactions within each of the plurality of sessions, after at least one of a successful configuration and a failure.

2. The method according to claim 1, wherein within one of the plurality of sessions a begin transaction call is sent by the ACS to the device causing the device to write-lock the writeable data for the at least one other ACS, whereupon a call for creating new data, or for deleting or modifying writeable data is performed.

3. The method according to claim 1, wherein within one of the plurality of sessions a call for creating new data, or for deleting or modifying writeable data is sent from the ACS to the device, causing the device to write-lock the writeable data for the at least one other ACS, whereupon the new data is created or the writeable data is deleted or modified.

4. The method according to claim 1, wherein releasing the write lock is coupled with the sending of a call from the device to the ACS to indicate an end of a transaction.

5. The method according to claim 1, wherein the ACS further sends a set of new values to the device, whereupon the device performs the write-locking and proceeds with the setting if the device allows the setting.

6. The method according to claim 5, whereupon the device performs the write-locking and proceeds with the setting upon the current values corresponding with actual values of the writeable data.

7. The method according to claim 5, wherein upon the device proceeding with the setting and the setting being successful, the ACS is informed of a successful setting and the device immediately releases the write-lock.

8. The method according to claim 5, wherein upon the device not proceeding with the setting, the ACS is informed accordingly, a rollback is performed, and the device releases the write-lock.

9. An auto configuration server for remote configuration of a device, in particular for use in the method of claim 1, said ACS being configured to instruct the device within a session, upon new data having to be created in the device or writeable data of the device having to be modified or deleted by the ACS, to write-lock at least the writeable data to be created, modified or deleted for the at least one other ACS, at the transaction level.

10. The auto configuration server according to claim 9, wherein the ACS is configured to send a call to the device to indicate a begin of a transaction causing the write locking of the writeable data for the at least one other ACS.

11. The auto configuration server according to claim 9, wherein the ACS is further configured to send a set of new values to the device.

12. A device having writeable data, and configured to be remotely configurable via a network by means of an ACS, in particular for use in the method of claim 1, said device being further configured to:

write lock writeable data within a session with the ACS, upon writeable data having to be created, modified or deleted; and release a write-lock within a session, at the transaction level, after at least one of a successful configuration of writeable data or a failure.

13. The device according to claim 12, wherein the device is configured to use the TR-069 CPE WAN management protocol for communicating between the ACS and the device.

* * * * *